United States Patent [19]
Galli

[11] Patent Number: 5,427,484
[45] Date of Patent: Jun. 27, 1995

[54] TOOL HOLDER

[76] Inventor: Ronald A. Galli, 1820 Brinston, Troy, Mich. 48083

[21] Appl. No.: 228,205

[22] Filed: Apr. 15, 1994

[51] Int. Cl.[6] .......................... B23C 9/00; B23B 29/04
[52] U.S. Cl. .................................. 409/234; 279/133; 408/238
[58] Field of Search ................ 409/234, 232; 408/238, 408/239 R; 229/132, 133

[56] References Cited

U.S. PATENT DOCUMENTS

| | | | |
|---|---|---|---|
| 3,460,847 | 8/1969 | Hohwart et al. | 279/4 |
| 3,592,937 | 7/1971 | Emeis | 23/273 |
| 3,813,823 | 6/1974 | Southland | 51/94 |
| 4,218,068 | 8/1980 | Lutz et al. | 408/238 X |
| 4,668,138 | 5/1987 | Carter | 409/234 |
| 4,776,734 | 10/1988 | Buettiker et al. | 409/234 |
| 4,801,227 | 1/1989 | Glimpel | 409/234 |
| 4,989,887 | 2/1991 | Jordan | 279/133 X |
| 5,040,932 | 8/1991 | Oshnock | 409/234 |
| 5,048,384 | 9/1991 | Carlen | 82/170 |
| 5,082,299 | 1/1992 | Beattie | 279/1 |
| 5,088,746 | 2/1992 | Dietz et al. | 279/4 |
| 5,286,042 | 2/1994 | Laube | 408/162 X |
| 5,314,198 | 5/1994 | Kanaan | 279/133 |

Primary Examiner—William Briggs
Attorney, Agent, or Firm—Charles W. Chandler

[57] ABSTRACT

A two-part tool holder for a milling tool, one part having a shank adapted to be mounted in a milling machine, the other part having an opening for receiving the cutting tool. The second part has an annular collar which receives a nose on the first part. Four adjusting screws on the collar engage the nose to laterally move the flutes of the end mill until there is essentially a zero runout of the flutes. The two parts are then fastened together.

2 Claims, 3 Drawing Sheets

TOOL HOLDER

BACKGROUND OF THE INVENTION

Invention is related to a milling tool holder which permits the flutes on the tool to be adjusted to rotate in a path of essentially zero runout.

Conventional end mill tools have a shank that may rotate slightly offset from the desired axis of rotation. The tool holder for the milling tool may also have a slight tolerance. These tolerances stack up, losing the precision desired of the tool.

Tool holders that support end mill tools or other rotatable tools may be found in U.S. Pat. No. 3,460,847 which was issued Aug. 12, 1969, to George Hohwart and Paul Toth for "Fixture Mounting Assembly"; U.S. Pat. No. 3,592,937 which was issued Jul. 13, 1971, to Relmer Emeis for "Device for Crucible-Free or Floating Zone Melting of a Crystalline Rod"; U.S. Pat. No. 3,813,823 which was issued Jun. 4, 1974, to John Robert Southland for "End Mill Grinder"; U.S. Pat. No. 4,668,138 which was issued May 26, 1987, to Jack W. Carter for "Tool Holder"; U.S. Pat. No. 5,040,932 which was issued Aug. 20, 1991, to Robert E. Oshnock for "Locator Mechanism for a Tool Holder Assembly"; U.S. Pat. No. 5,048,384 which was issued Sep. 17, 1991, to Erie T. Carlen for "Centering Device"; U.S. Pat. No. 5,082,299 which was issued Jan. 21, 1992, to James C. Beattie for "Adjustable Rotational Coupler"; U.S. Pat. No. 5,088,746 which was issued Feb. 18, 1992, to Richard A. Dietz, Robert Laube and Eugene Andre, Sr., for "Zero-Deflection Support Chuck".

SUMMARY OF THE INVENTION

The preferred embodiment of the Invention comprises a two piece tool holder. One piece has a tapered shank that is mounted in the milling machine. The second piece or head is connected to the shank with four adjusting screws. The tool is mounted in the head. An indicator is placed on the flutes which are then rotated by hand. The adjusting screws are adjusted until the flutes rotate with no variation of the indicator. The two pieces of the tool holder are then rigidly fastened together.

Still further objects and advantages of the invention will become readily apparent to those skilled in the art to which the invention pertains upon reference to the following detailed description.

DESCRIPTION OF THE DRAWINGS

The description refer to the accompanying drawings in which like reference characters refer to like reference parts through the several views, and in which.

DESCRIPTION OF THE PREFERRED EMBODIMENT

Figure 1:
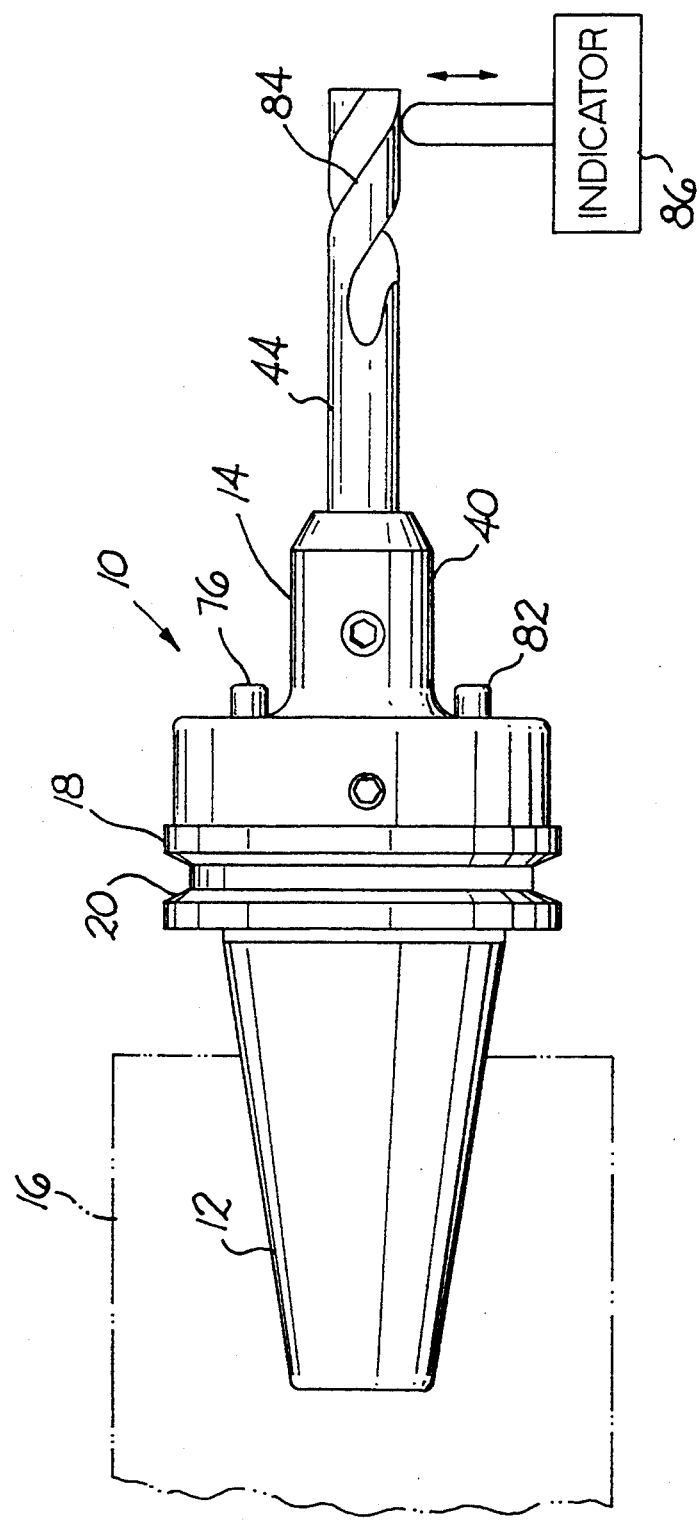
FIG. 1 is a view of a two-piece tool holder illustrating the preferred embodiment of the invention.

Referring to the drawings, FIG. 1 illustrates an elongated two piece tool holder 10 which includes a tapered shank 12 and a head 14. A conventional milling machine 16, illustrated in phantom, is normally connected to the shank in the manner well known to those skilled in the art. The shank has an enlarged circumferential collar 18 with an annular groove 20.

Figure 2:
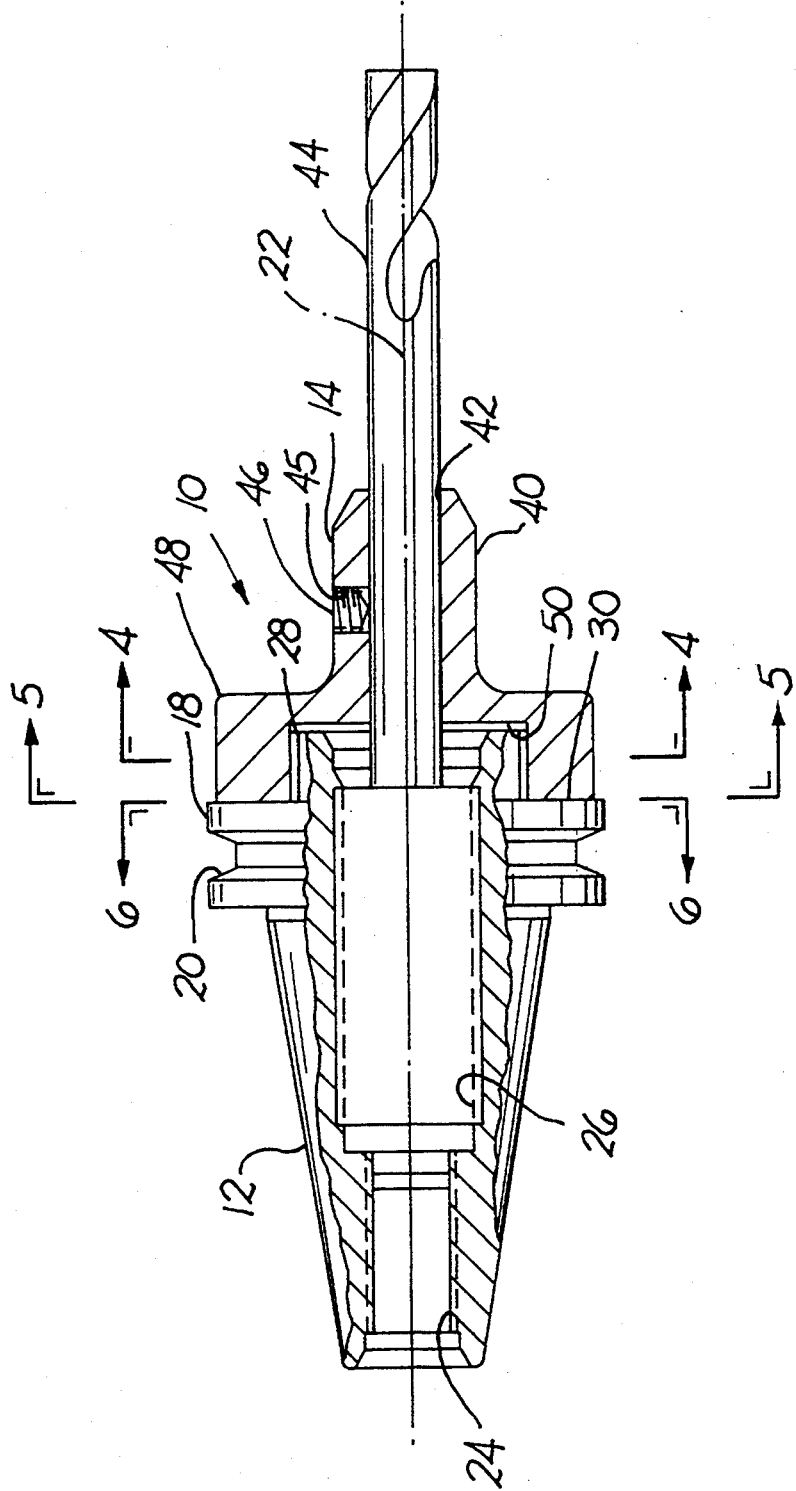
FIG. 2 is a partially sectional view of the tool holder of FIG. 1.

Referring to FIG. 2, the shank is mounted in the milling machine so as to be rotated about an axis 22. Axis 22 coincides with the longitudinal axis of the tool holder.

The narrow end of the shank has a threaded opening 24 about 1⅛" long, formed about axis 22 and is used to connect the tool holder to the milling machine. A drilled and tapped longitudinal bore 26 extends from opening 24 through the balance of the shank.

Figure 4:
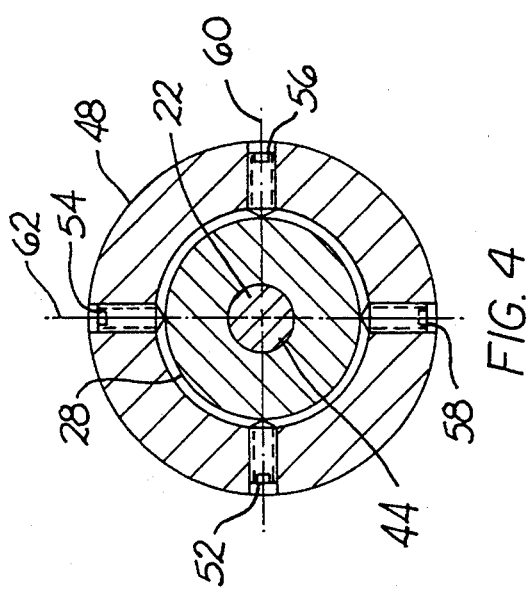
FIG. 4 is a view generally as seen along lines 4—4 of FIG. 2.

The inner end of the shank has a neck 28, which for illustrative purposes, is about 1.39" in diameter and extends 0.38" beyond collar 18. Neck 28, as can be seen in FIG. 4, has a cylindrical outside surface with a generally flat end. The cylindrical surface is formed about the longitudinal axis of the shank.

Figure 6:
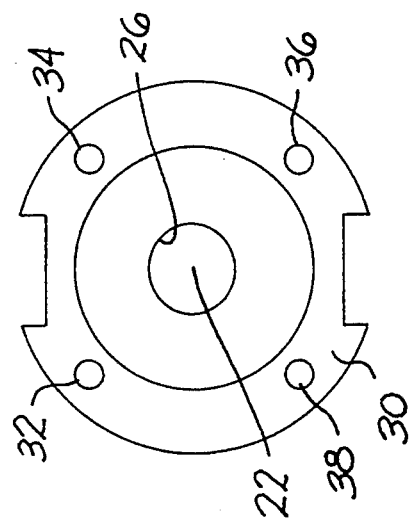
FIG. 6 is a view generally as seen along lines 6—6 of FIG. 1.
Figure 3:
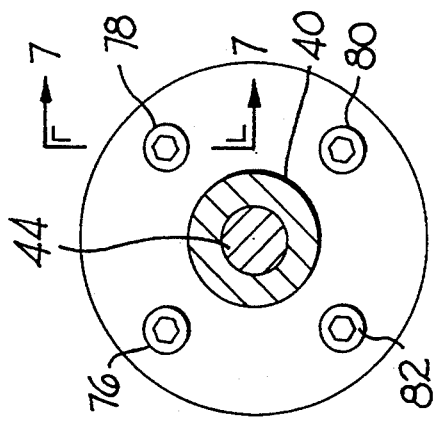
FIG. 3 is a view generally as seen along lines 3—3 of FIG. 1.

Referring to FIGS. 2 and 6, collar 18 has a flat annular face 30 supported such that axis 22 is perpendicular to face 30. Collar 18 also has four tapped openings 32, 34, 36, and 38, each formed along an axis parallel to axis 22.

Tapped holes 32–38 are formed beyond the outer cylindrical surface of neck 28, 90° apart around axis 22.

Referring to FIG. 2, head 14 of the tool holder has an elongated nose 40 with an internal longitudinal bore 42 for receiving end mill tool 44. Nose 40 has a tapped opening 45 for receiving set screw 46 which rigidly connects tool 44 to head 14.

The head also has an enlarged annular collar 48. Collar 48 has an internal cylindrical cavity 50 formed about the longitudinal axis of the head. The depth of the cavity is greater than the distance nose 28 extends beyond collar 18. Further, the diameter of the cylindrical side wall of the cavity is greater than the diameter of nose 28. For illustrative purposes the diameter of nose 28 may be 1.390" while the diameter of cavity is 1.410". This clearance between the cylindrical wall of the cavity and the cylindrical surface of the nose permits the head of the tool to be laterally adjusted with respect to the shank.

Figure 7:
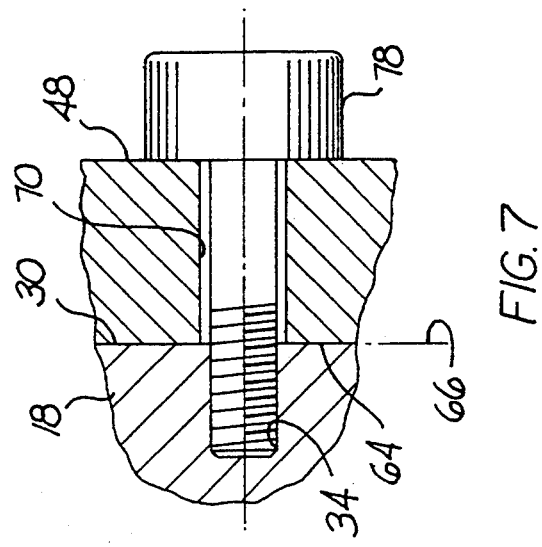
FIG. 7 is an enlarged sectional view generally as seen along lines 7—7 of FIG. 3.

Referring to FIGS. 2 and 4, collar 48 carries four threadably adjusted set screws 52, 54, 56 and 58. The four set screws are disposed 90° apart about axis 22. Set screws 52 and 56 are threadably adjusted along an axis 60 that is transverse to the axis of rotation of the tool and passes through axis 22. Similarly, set screws 54 and 58 are threadably adjusted along an axis 62 that is 90° with respect to axis 60, and which passes through and intersects axis 22. Both axes 60 and 62 lie in a plane that is parallel to the flat end face 64 of the head as viewed in FIG. 7. Axis 22 is perpendicular to end face 64. End face 64 of the head is in surface-to-surface contact with flat face 30 of collar 18 when the two parts of the tool holder are fastened together.

Figure 5:
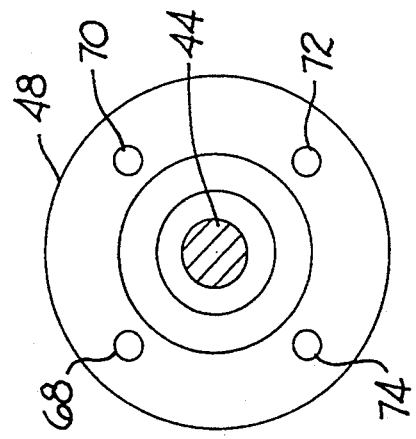
FIG. 5 is a view generally as seen along lines 5—5 of FIG. 2.

Referring to FIG. 5, collar 48 has four drilled holes 68, 70, 72, and 74 which are parallel to the longitudinal axis of the tool holder, and are aligned with tapped openings 32, 34, 36, and 38. Hole 68 is aligned with tapped hole 34. Hole 70 is aligned with tapped hole 32.

Hole 72 is aligned with tapped hole 38 and hole 74 is aligned with tapped hole 36. The four drilled holes each have a larger diameter than the tapped holes. For example, the drilled holes each have a diameter of 0.225" while the tapped holes are 0.159" in diameter so that the head of the tool holder is laterally adjustable with respect to the shank. Four adjustment set screws 76, 78, 80 and 82 are received in the drilled holes and threadably engaged in the tapped holes, in the manner illustrated in FIG. 7.

The user installs cutting tool 44 into head 14 and then tightens fastener 46 to firmly connect the tool to the head. As illustrated in FIG. 2, the end of the tool may be partially inserted into opening 26 of the shank which has a diameter larger than the tool to permit adjustment of the tool with respect of the shank.

Adjustment screws 52, 54, 56, and 58 are initially backed off and then tightened to form a snug engagement with neck 28. As best illustrated in FIG. 1, the tool has flutes 84. The user places a conventional indicator device 86 so that it engages the flutes. The user then rotates the tool by hand, noting the amount of lateral indicated runout of the flutes. He turns the tool until he achieves a minus reading. He then turns the adjustment screw closest in line with the indicator point to reduce the runout to approximately one-half. He repeats this procedure until all the adjustment screws are tight, with essentially a zero runout of the flutes. He then tightens tightening screws 76, 78, 80, and 82 firmly. The holder is now ready for use.

The tool holder is primarily intended for precision finishing operations on CNC or manual machines. In many instances, where close tolerances and fine finishes are specified, milling can often be substituted for grinding operations with substantial savings. The preferred tool holder makes it possible to true up an end mill by indicating the flutes, thus eliminating runout in special size cutters. It also allows for truing reamers, drills and small center drills. The adjustment is fast and easily accomplished.

Having described my invention, I claim:

1. A tool assembly comprising an elongated cutting tool (44) having a first rotational axis, and a tool holder for mounting said tool in a cutting machine:

said tool holder comprising a first hollow member (12) mountable in a cutting machine for rotation around a second axis (22), said first hollow member having a first flat radial end face (30) normal to said second axis, and an annular neck structure (28) projecting beyond said end face, said neck structure having a cylindrical side surface concentric around said second axis;

said tool holder further comprising a second hollow annular member (14) that includes an annular collar (48) having an internal annular surface surrounding the cylindrical side surface of said neck structure with an annular clearance therebetween, and an elongated tubular nose (40) extending from said collar, said nose having an elongated cylindrical bore (42) fitting on the aforementioned cutting tool so that said second hollow member and the tool are rotatable as a unit around said first axis;

said second hollow member (14) having a second flat end face (64) normal to said first axis, and seated against said first end face for transverse slidable adjustment of said second hollow member normal to said second axis;

a plurality of radial adjustment screws equidistantly spaced around said collar, each adjustment screw being radially adjustable in said collar for movement toward or away from said first axis, each adjustment screw having an inner end engageable against the cylindrical side surface on said annular neck structure, whereby selective adjustments of said screws produce transverse adjustment of said second hollow member to a position wherein said first axis is coincident with said second axis; and said annular collar having a plural number of mounting holes extending parallel to said first axis, and a mounting screw extending through each of said mounting holes into said first hollow member, whereby said second hollow member is rigidly clamped to said first hollow member, each of said mounting holes having an annular clearance with respect to the associated mounting screw, whereby the mounting screws are precluded from interfering with transverse adjustments of said second hollow member.

2. A tool assembly as defined in claim 1, in which there are four radial adjustment screws.

* * * * *